United States Patent
Nowlan et al.

(10) Patent No.: US 8,300,560 B2
(45) Date of Patent: Oct. 30, 2012

(54) USING AUXILIARY INFORMATION TO DIRECT USERS OF WIRELESS DEVICES TO SAFETY IN RESPONSE TO EMERGENCY ALERT SYSTEM ALERTS

(75) Inventors: Steven J. Nowlan, South Barrington, IL (US); Wayne Ballantyne, Coconut Creek, FL (US); Mark A. Gannon, Sleepy Hollow, IL (US); Louis J. Lundell, Buffalo Grove, IL (US); Louis J. Vannatta, Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1059 days.

(21) Appl. No.: 11/966,536

(22) Filed: Dec. 28, 2007

(65) Prior Publication Data

US 2009/0170467 A1    Jul. 2, 2009

(51) Int. Cl.
    H04L 12/16    (2006.01)
(52) U.S. Cl. .................. 370/270; 455/404.1; 455/466
(58) Field of Classification Search ..................... None
    See application file for complete search history.

(56) References Cited

U.S. PATENT DOCUMENTS

| | | | |
|---|---|---|---|
| 6,847,892 B2 | 1/2005 | Zhou et al. | |
| 7,054,612 B2 | 5/2006 | Patel | |
| 7,262,692 B2 | 8/2007 | Ho | |
| 2003/0069002 A1 | 4/2003 | Hunter et al. | |
| 2003/0137415 A1 | 7/2003 | Thomson | |
| 2006/0009191 A1 | 1/2006 | Malone, III | |
| 2006/0014548 A1 | 1/2006 | Bolin et al. | |
| 2006/0052090 A1 | 3/2006 | Behr et al. | |
| 2006/0058948 A1 | 3/2006 | Blass et al. | |
| 2006/0071783 A1 | 4/2006 | Culpepper et al. | |
| 2006/0158328 A1 | 7/2006 | Culpepper et al. | |
| 2007/0049259 A1 | 3/2007 | Onishi et al. | |
| 2007/0072583 A1* | 3/2007 | Barbeau et al. | ............ 455/404.2 |
| 2007/0182539 A1 | 8/2007 | Ho | |

(Continued)

FOREIGN PATENT DOCUMENTS

JP    05-298569 A    11/1993

(Continued)

OTHER PUBLICATIONS

Dong Sung Kim, "PCT International Search Report and Written Opinion," WIPO, ISA/KR, Korean Intellectual Property Office, Daejeon, Republic of Korea, May 29, 2009, 11 pages.

(Continued)

*Primary Examiner* — Phuoc Doan

(57)    ABSTRACT

A method and a wireless device (120, 122) utilize auxiliary information associated with an emergency alert system alert message to direct a user of the wireless device (120, 122) to safety. A wireless communication system (102) wirelessly transmits an emergency alert system (EAS) alert message to a wireless device (120, 122). The wireless communication system (102) also wirelessly transmits an augmented EAS alert message to the wireless device (120, 122). The augmented EAS alert message includes auxiliary information that provides information to the wireless device (120, 122) to direct a user of the wireless device (120, 122) to move at least one of toward a safe zone (150) and away from a danger zone (158). The auxiliary information in the augmented EAS alert message is optionally adjusted based on any combination of: the location of the wireless device, the safe zone, and the danger zone, and the logistics of a vicinity affected by the danger zone.

14 Claims, 7 Drawing Sheets

U.S. PATENT DOCUMENTS

| | | |
|---|---|---|
| 2007/0194922 A1 | 8/2007 | Nathan et al. |
| 2008/0111705 A1 | 5/2008 | Lee |
| 2008/0291849 A1* | 11/2008 | Ostermeier et al. .......... 370/270 |
| 2009/0023481 A1* | 1/2009 | Foster et al. .................. 455/573 |
| 2009/0170468 A1 | 7/2009 | Kane et al. |
| 2009/0170529 A1 | 7/2009 | Kane |
| 2010/0001858 A1 | 1/2010 | Daly et al. |
| 2010/0015943 A1* | 1/2010 | Karl et al. ................. 455/404.1 |

FOREIGN PATENT DOCUMENTS

| | | |
|---|---|---|
| JP | 2007-034671 A | 2/2007 |
| JP | 2007-087366 A | 4/2007 |
| KR | 10-2006-0069400 A | 6/2006 |
| KR | 10-2006-0089975 A | 8/2006 |
| KR | 10-2007-0002502 A | 1/2007 |
| KR | 10-2007-0024322 A | 3/2007 |
| KR | 10-2007-0043155 A | 4/2007 |

OTHER PUBLICATIONS

U.S. Appl. No. 11/965,109, filed Dec. 27, 2007, Kane.

U.S. Appl. No. 11/966,143, filed Dec. 28, 2007, Kane et al.

* cited by examiner

USING AUXILIARY INFORMATION TO DIRECT USERS OF WIRELESS DEVICES TO SAFETY IN RESPONSE TO EMERGENCY ALERT SYSTEM ALERTS

CROSS-REFERENCE TO RELATED APPLICATIONS

This application is related to co-pending U.S. patent application Ser. No. 11/965,109, filed on Dec. 27, 2007, and entitled "EMERGENCY EXIT ROUTING USING WIRELESS DEVICES DURING EMERGENCY SITUATIONS", and to co-pending U.S. patent application Ser. No. 11/966,143, filed on Dec. 28, 2007, and entitled "PROMPTING AND DIRECTING USERS TO SAFETY DURING EMERGENCY SITUATIONS"; the collective entire disclosure of the above-identified applications being hereby incorporated by reference.

FIELD OF THE INVENTION

The present invention generally relates to the field of emergency alert system alert transmissions and wireless communication systems, and more particularly relates to augmenting broadcast emergency alert system alert transmissions with auxiliary information that directs a user of a wireless device toward safety.

BACKGROUND OF THE INVENTION

Emergency alert systems (EAS) are used to communicate vital information to the public during emergency situations. This information is generally conveyed to the public via televisions or public addressing systems.

The EAS in the United States is composed of analog radio broadcast stations including AM, FM, and Low-power FM (LPFM) stations; digital audio broadcasting (DAB) stations, including digital AM, FM, and Low-power FM stations; analog television broadcast stations including Class A television (CA) and Low-power TV (LPTV) stations; digital television (DTV) broadcast stations, including digital CA and digital LPTV stations; analog cable systems; digital cable systems which are the portion of a cable system that delivers channels in digital format to subscribers at the input of a Unidirectional Digital Cable Product or other navigation device; wireline video systems; wireless cable systems which may consist of Broadband Radio Service (BRS), or Educational Broadband Service (EBS) stations; DBS services, including certain Ku-band Fixed-Satellite Service Direct to Home providers; SDARS; participating broadcast networks, cable networks and program suppliers; and other entities and industries operating on an organized basis during emergencies at the National, State and local levels. These entities are referred to collectively as the Emergency Alert System (the EAS). At a minimum, the participants making up the EAS must use a common EAS protocol to send and receive emergency alerts.

The common EAS protocol includes plans to use the EAS header codes and messages that will be transmitted by key EAS sources (NP, LP, SP and SR). State and local plans contain unique methods of EAS message distribution such as the use of the Radio Broadcast Data System (RBDS). The EAS uses a four part message for an emergency activation of the EAS. The four parts are: Preamble and EAS Header Codes; audio Attention Signal; message; and, Preamble and EAS End Of Message (EOM) Codes. The message may be audio, video or text. Characters are ASCII seven bit characters as defined in ANSI X3.4-1977 ending with an eighth null bit (either 0 or 1) to constitute a full eight-bit byte.

The EAS protocol, including any codes, is dictated by the government. The EAS protocol and message format are specified in the following representation.

[PREAMBLE]ZCZC-ORG-EEE-PSSCCC+TTTT-JJJH-HMM-LLLLLLLL-(one second pause)
[PREAMBLE]ZCZC-ORG-EEE-PSSCCC+TTTT-JJJH-HMM-LLLLLLLL-(one second pause)
[PREAMBLE]ZCZC-ORG-EEE-PSSCCC+TTTT-JJJHH MM-LLLLLLLL-(at least a one second pause)
(transmission of 8 to 25 seconds of Attention Signal)
(transmission of audio, video or text messages)
(at least a one second pause)
[PREAMBLE]NNNN (one second pause)
[PREAMBLE]NNNN (one second pause)
[PREAMBLE]NNNN (at least one second pause)

[PREAMBLE] This is a consecutive string of bits (sixteen bytes of AB hexadecimal [8 bit byte 10101011]) sent to clear the system, set AGC and set asynchronous decoder clocking cycles. The preamble must be transmitted before each header and End Of Message code.

ZCZC—This is the identifier, sent as ASCII characters ZCZC to indicate the start of ASCII code.

ORG—This is the Originator code and indicates who originally initiated the activation of the EAS. These codes are specified by law.

EEE—This is the Event code and indicates the nature of the EAS activation. The Event codes are specified by law. The Event codes must be compatible with the codes used by the NWS Weather Radio Specific Area Message Encoder (WRSAME).

PSSCCC—This is the Location code and indicates the geographic area affected by the EAS alert. There may be 31 Location codes in an EAS alert. The Location code uses the Federal Information Processing Standard (FIPS) numbers as described by the U.S. Department of Commerce in National Institute of Standards and Technology publication FIPS PUB 6-4. Each state is assigned an SS number as specified by law. Each county and some cities are assigned a CCC number. A CCC number of 000 refers to an entire State or Territory. P defines county subdivisions as follows: 0=all or an unspecified portion of a county, 1=Northwest, 2=North, 3=Northeast, 4=West, 5=Central, 6=East, 7=Southwest, 8=South, 9=Southeast. Other numbers may be designated later for special applications. The use of county subdivisions will probably be rare and generally for oddly shaped or unusually large counties. Any subdivisions must be defined and agreed to by the local officials prior to use.

+TTTT—This indicates the valid time period of a message in 15 minute segments up to one hour and then in 30 minute segments beyond one hour; i.e., +0015, +0030, +0045, +0100, +0430 and +0600.

JJJHHMM—This is the day in Julian Calendar days (JJJ) of the year and the time in hours and minutes (HHMM) when the message was initially released by the originator using 24 hour Universal Coordinated Time (UTC).

LLLLLLLL—This is the identification of the EAS Participant, NWS office, etc., transmitting or retransmitting the message. These codes will be automatically affixed to all outgoing messages by the EAS encoder.

NNNN—This is the End of Message (EOM) code sent as a string of four ASCII N characters.

Enhancements to the Emergency Alert System have been proposed. Specifically, the Commercial Mobile Service Alert Initiative has been created to allow wireless cellular carriers to transmit emergency alert messages to cell phones and other devices having text message capabilities; see http://www.fcc.gov/pshs/cmsaac/docs/pdf/Charter.pdf. Yet these proposals fail to dynamically supply local contextually important information to particular recipients of the message.

As can be appreciated from the discussion above, conventional emergency alert systems may generally have sent notification messages to recipients over a relatively wide geographic area to alert the recipients of an emergency situation, but have failed to provide local contextually important information to particular recipients of the messages.

Therefore a need exists to overcome the problems with the prior art as discussed above.

SUMMARY OF THE INVENTION

Briefly, in accordance with one embodiment of the present invention, disclosed is a method for transmitting emergency alert system messages to wireless devices. The method comprises: receiving an emergency alert system (EAS) alert message for delivery to one or more wireless devices in a coverage area of a wireless communication system; generating, in response to receiving the EAS alert message, an augmented EAS alert message that includes auxiliary information that provides information to the one or more wireless devices to direct one or more users of the respective one or more wireless devices to move at least one of toward a safe zone and away from a danger zone; and wirelessly transmitting the augmented EAS alert message in the coverage area, the augmented EAS alert message being destined for reception by the one or more wireless devices.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and in most cases can wirelessly transmit signals, and may also operate in a wireless communication system. For example, and not for any limitation, a wireless device can include any one or a combination of the following: a two-way radio, a cellular telephone, a mobile phone, a smartphone, a two-way pager, a wireless messaging device, a laptop/computer, automotive gateway, residential gateway, and any type of wireless communication device.

Figure 1:
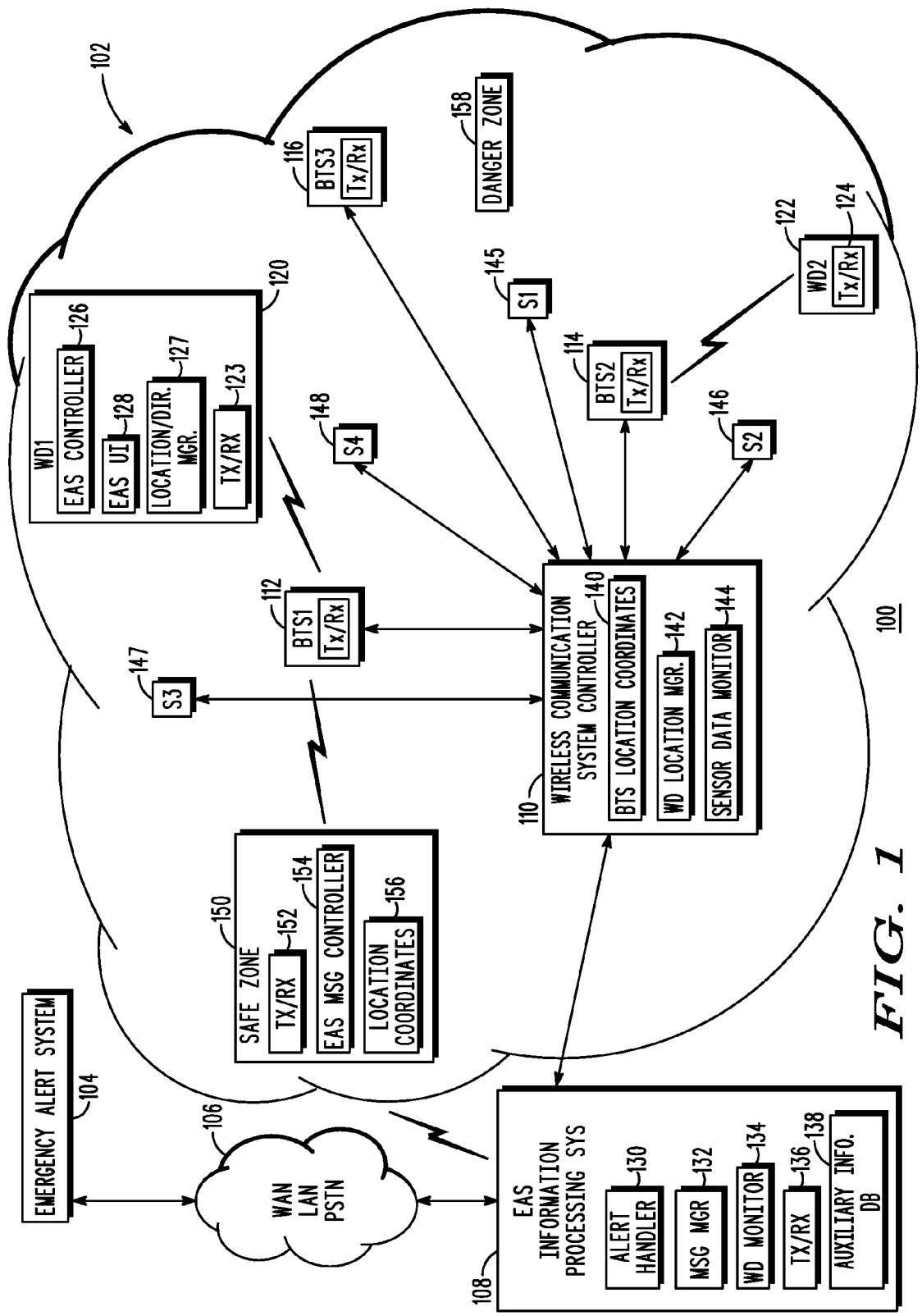
FIG. 1 is a block diagram illustrating an example of a wireless communication system and an emergency alert system, according to one embodiment of the present invention.

According to one embodiment of the present invention as shown in FIG. 1 a general operating environment 100 for implementing one or more embodiments of the present invention is illustrated. In particular, FIG. 1 shows one example of a wireless communication system and network 102 comprising one or more access networks such as a packet data network and/or a circuit services network. Throughout the following discussion, the communication standard of the wireless communication system and network 102 may be referred to as Code Division Multiple Access ("CDMA"). However, the present invention is not limited to CDMA. For example, other communication standards such as Time Division Multiple Access ("TDMA"), Global System for Mobile Communications ("GSM"), General Packet Radio Service ("GPRS"), Integrated Dispatch-Enhanced Network (iDEN), Frequency Division Multiple Access ("FDMA"), other IEEE 802.16 standards, Orthogonal Frequency Division Multiplexing ("OFDM"), Orthogonal Frequency Division Multiple Access ("OFDMA"), LTE, UMB, Wireless LAN ("WLAN"), WiMax or the like are also applicable to the present invention. Other applicable communications standards include those used for Public Safety Communication Networks including Project 25 ("P25") or TErrestrial TRunked rAdio ("TETRA").

In one embodiment, the packet data network is an IP based connectivity network, which provides data connections at much higher transfer rates than a traditional circuit services network. A packet data network can comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like. A circuit services network provides, among other things, voice services to wireless devices 120, 122, in the network 102. It should be noted that access networks can also include additional network components (not necessarily shown in FIG. 1) such as controllers, transport/interconnect gear, network management modules, and the like, that should be generally known to those of ordinary skill in the art. For example, in many cases there would be a Packet Data Gateway element between the EAS 108 and the IP cloud 106, and the EAS 108 would reside in the wireless carrier's core network.

The wireless communication system and network 102, in this example, also includes multiple Base Transceiver Stations ("BTSs" or "base stations") 112, 114, 116, communicatively coupled to a central wireless communication system controller 110. Each base station 112, 114, 116, includes at least one transceiver (Tx/Rx) which can wirelessly communicate (wirelessly transmit and receive signals) with one or more wireless devices 120, 122, located in particular coverage areas covered by each base station 112, 114, 116. Each base station 112, 114, 116, includes a processor, such as one or more microprocessors, microcontrollers, digital signal processors ("DSPs"), or combinations thereof. Each base station 112, 114, 116, further includes one or more memory devices, associated with the processor, that store data and programs that may be executed by the processor. The central wireless communication system controller 110 includes a one or more processors and associated memory devices that store data and programs that may be executed by the one or more processors. Also, in the memory, are stored base station coordinates for each of the base stations 112, 114, 116, which identify the geographic location of each of the base stations 112, 114, 116, in a universal coordinate system. A wireless device location monitor 142 in the central wireless communication system controller 110, according to one embodiment, keeps track of the location of each of the wireless devices 120, 122, in the wireless communication system and network 102. A sensor data monitor 144, according to the embodiment shown in FIG. 1, is communicatively coupled with a plurality of sensors 145, 146, 147, 148, located in the environment 100. Although not shown in FIG. 1, the sensors 145-148 may also include TX/RX transceivers. The sensor data monitor 144 monitors and keeps track of sensor data from the plurality of sensors 145, 146, 147, 148. Each of the sensors 145, 146, 147, 148, can sense certain data about the particular vicinity in which the sensor is located. There are a variety of sensors and sensor data that can be monitored for different applications, as will be discussed in more detail below. Each of the components of the central wireless communication system controller 110 and the sensors 145, 146, 147, 148, will be discussed in greater detail below.

An information processing system 108, in this example, is designated as an interface system between the wireless network 102 and an Emergency Alert System (EAS) 104. The information processing system 108 may also be referred to as an EAS information processing system 108. The Emergency Alert System 104 generates emergency alerts and messages typically issued by a national, state, or local government. The EAS information processing system 108, according to one embodiment shown in FIG. 1, includes an emergency alert manager 130, an emergency message manager 132, a wireless device monitor 134, a transceiver 136, and an auxiliary information database 138. Each of these components will be discussed in greater detail below. All of these components may not be found in every embodiment of the invention. Also, one or more of these components can be implemented as a functional component using a combination of hardware, software, or both. The transceiver 136, for example, may be optional in certain EAS system configurations. As an example, and not for limitation, the EAS system 108 in various embodiments may be part of a wireless carrier's core network and the transceiver 136 functions could be at least in part incorporated into the wireless carrier's core network.

The EAS information processing system 108 communicatively couples to the Emergency Alert System 104 via one or more external networks, such as a Wide Area Network ("WAN"), a Local Area Network ("LAN"), and a Public Switched Telephone Network ("PSTN"). These various types of external networks are collectively indicated in FIG. 1 by the single cloud symbol 106. It should be understood that many different types of networks and network links, and combinations thereof, may be represented by the network cloud 106. For example, and not for limitation, the Internet, a private local area network, one or more broadcast channels, one or more cable networks, one or more telephone networks, one or more wireless and/or wired network links, and one or more satellite communication networks, or a combination thereof, may be included in various embodiments of the present invention.

The EAS information processing system 108 communicatively couples emergency alert messages to the central wireless communication system controller 110 which can communicate messages to the wireless devices 120, 122, via wireless transmissions by the base stations 112, 114, 116. The wirelessly transmitted messages, which can comprise the emergency alert messages, are typically destined for reception by the one or more wireless devices 120, 122. Wireless devices 120, 122, are typically selected to receive a transmitted message by including with the transmitted message certain destination identifying information, such as an address that the destination wireless device 120, 122, will be receptive to receive the wirelessly transmitted message. A message is therefore destined for reception by a destination wireless device 120, 122, when the message includes the certain destination identifying information that selects a particular wireless device 120, 122, or a particular group of wireless devices 120, 122, to receive the transmitted message.

The EAS information processing system 108 receives the alerts from the Emergency Alert System 104, in one embodiment, via one or more particular communication channel(s), indicated by the network cloud 106, and sends corresponding emergency alert messages to the wireless devices 120, 122, in the wireless communication system and network 102. It should be noted that the EAS information processing system 108 can also be communicatively coupled to a local emergency alerting system, such as a fire alarm system, a biological pollutant alerting system, or other type of local alerting system, and can send alert messages from such local emergency alerting system to the wireless devices 120, 122, in the wireless communication system and network 102.

The wireless communication system and network 102 supports any number of wireless devices 120, 122, which can be single mode or multi-mode devices. Multi-mode devices are capable of communicating over multiple access networks with varying technologies. For example, a multi-mode wireless device can communicate over various access networks 102 such as GSM, UMTS, CDMA, or WiFi. In addition, multiple communication protocols such as Push-To-Talk ("PTT"), Push-To-Talk Over Cellular ("PoC"), voice traffic channel, multimedia messaging, web browsing, Voice over IP (VoIP), and multimedia streaming may be utilized.

Each wireless device 120, 122, according to one embodiment, includes an emergency alert system controller 126, a transceiver 123, an EAS user interface 128, and a location/ direction manager 127. Each of these components will be discussed in greater detail below.

One or more safe zones 150 may be found in the environment 100. A safe zone 150 represents a location and/or structure that are considered safe for users of the wireless devices 120, 122, to go to in an emergency alert situation. Safe zones 150, for example and not for any limitation, can include a shelter, a hospital, a government building, a vehicle, and/or a designated safe area associated with a vicinity and/or structure, according to the emergency alert that is activated.

During times of an emergency, such as a fire, hurricane, tornado, earthquake, blackout, national emergency, or any other type of emergency or critical situation, the Emergency Alert System 104 sends out (typically broadcasts) an emergency alert signal and message. The emergency alert signal and message are received by the EAS information processing system 108, such as from the one or more particular communication channel(s) indicated by the network cloud 106. The EAS alert handler 130 in the EAS information processing system 108 then forwards a corresponding emergency alert message to the wireless communication system controller 110, which then with the base stations 112, 114, 116, transmits the emergency alert message to the one or more wireless devices 120, 122, in a given coverage area. Alternatively, the EAS information processing system 108 may receive an emergency alert signal from a local emergency alerting system. The EAS alert handler 130 in the EAS information processing system 108, in response to receiving the emergency alert signal, then generates its own emergency alert message and sends this emergency alert message to the one or more wireless devices 120, 122, in a given coverage area.

The emergency alert message can be transmitted to each specific wireless device 120, 122, within a given coverage area. Alternatively, the emergency alert message can be broadcast transmitted to all (non-specific) wireless devices 120, 122, within a given coverage area. For example, a wireless communication system 102 may transmit a broadcast SMS message to all wireless devices in a given coverage area. As a third alternative, the emergency alert message can be both transmitted to specific one or more wireless devices 120, 122, in a first coverage area and also broadcast transmitted to all (non-specific) wireless devices 120, 122, within a second coverage area that may coincide with the first coverage area or is different than the first coverage area. For purposes of this discussion, the emergency alert message is a message to evacuate the area where an emergency/dangerous event has occurred, also referred to as a danger zone 158. However, any type of emergency alert message can be transmitted to the wireless devices 120, 122, via the EAS information processing system 108.

The EAS alert handler 130 determines, from the emergency alert signal and message received by the EAS information processing system 108, the type of emergency alert condition that has been notified by the Emergency Alert System 104 and the specific location (or general location) of the danger zone 158.

The EAS alert handler 130, after sending the emergency alert message to the wireless devices 120, 122, and after determining the type of emergency alert condition that has been notified by the Emergency Alert System 104 and the specific location (or general location) of the danger zone 158, instructs the EAS message manager 132 to prepare an augmented emergency alert message, as will be discussed in more detail below.

Figure 2:
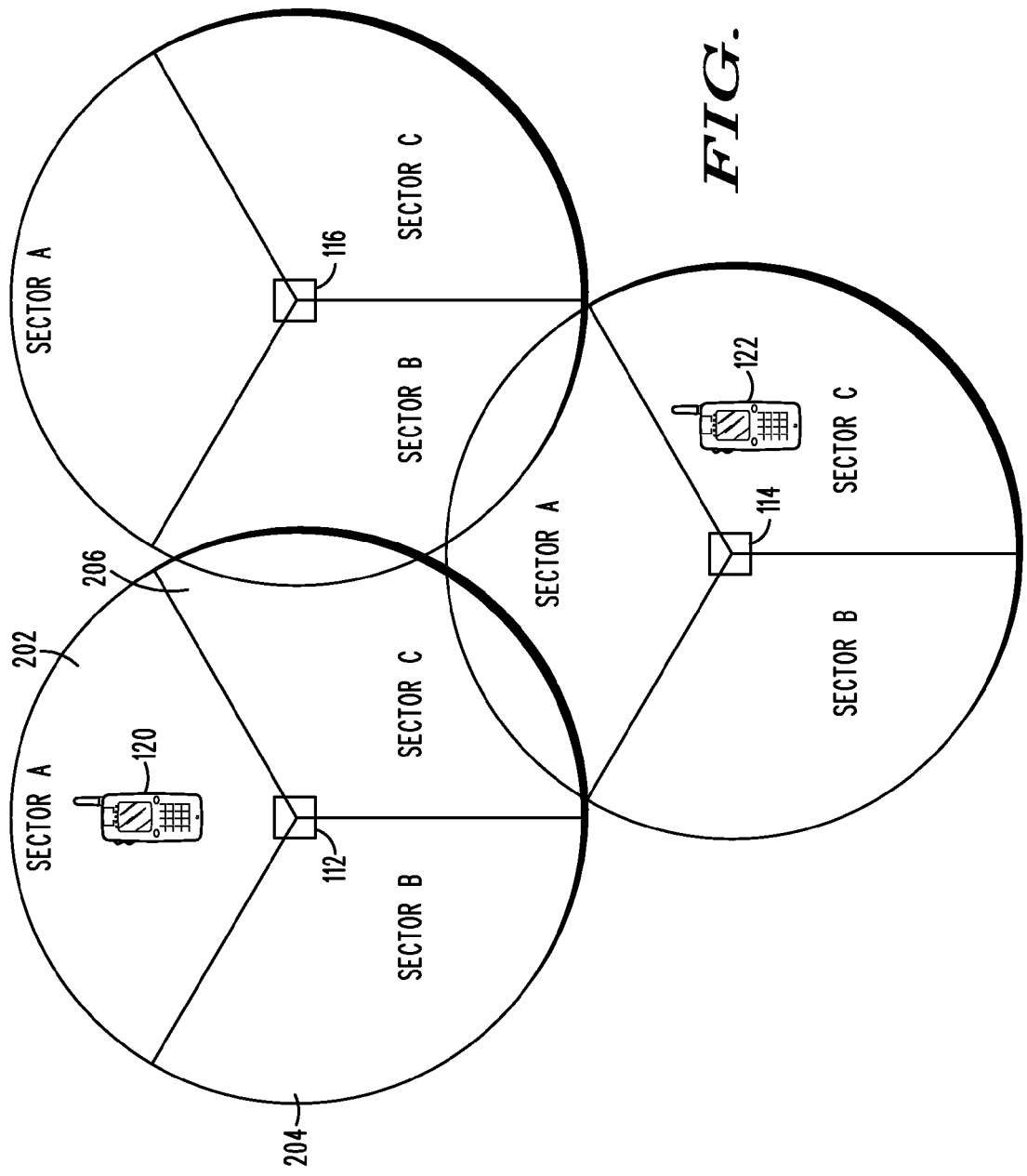
FIG. 2 is a block diagram illustrating wireless communication system coverage areas divided into sectors for the example of FIG. 1, according to one embodiment of the present invention.

The wireless device monitor 134 can identify the wireless devices 120, 122, in a given coverage area. For example, wireless device monitor 134 can communicate with the wireless device location manager 142 in the wireless communication system controller 110 to identify the locations (or general locations) of the wireless devices 120, 122. In one embodiment, such as illustrated in FIG. 2, the general location of a wireless device 120, 122, can be identified by the particular base station 112, 114, 116, and associated coverage area, that the wireless device 120, 122 is in. A wireless device 120, 122, registers with a base station 112, 114, 116, to be in wireless communication with the wireless communication system and network 102. As the wireless device 120, 122, roams from a first coverage area to a second coverage area, different from the first, the wireless device 120, 122, registers with the particular base station to communicate in the particular coverage area. This registration process, and the associated coverage area where a wireless device 120, 122, is located, can be tracked by the wireless device location manager 142.

As shown in FIG. 2, a base station coverage area can be divided into sectors. For example, the first base station 112 has a coverage area divided into three sectors A 202, B 204, and C 206. These three sectors allow more space diversity within the coverage area. Up to three wireless devices 120, 122 can be contemporaneously communicating with a base station 112, 114, 116, thereby more efficiently using the available space to maintain a higher communication throughput.

Additionally, by using multiple sectors A, B, C, as is common in wireless networks to improve cellular system capacity, to divide a coverage area of a base station, it also provides finer granularity in identifying a geographic location of a wireless device that is in communication with the base station. As can be seen in FIG. 2, an omni-directional coverage area (including all three sectors) will identify a wireless device only within the entire circular coverage area. There is no indication of relative location of wireless device to the central base station. On the other hand, by using three sectors a geographic location of a wireless device can be identified to within one of the three sectors.

As an example, the first wireless device 120 is shown in sector A of the coverage area of the first base station 112. The second wireless device 122 is in sector C of the second base station 114. If the geographic locations of the first and second base stations 112, 114, are known, and the relative orientation of the sectors 202, 204, 206, are also given, it is possible to approximate the geographic locations of the wireless devices 120, 122, by the sector of coverage area of a base station within which each wireless device is registered.

The wireless device location manager 142 (as shown in FIG. 1), using the mechanism discussed above, or another location monitoring mechanism, can keep track of the geographic locations of the wireless devices 120, 122, in the wireless communication system and network 102. As another example, wireless devices 120, 122, can use a GPS receiver module 320 (see FIG. 3) included with each wireless device 120, 122, to track their own geographic location. Then, according to one embodiment, the wireless device location manager 142 can interrogate each wireless device 120, 122, to receive location information from the wireless device 120, 122. Alternatively, the wireless devices 120, 122, can report their location information to the wireless device location manager 142 according to certain time intervals or in response to certain events, and without interrogation by the wireless device location manager 142.

By maintaining and updating this received location information in memory, the wireless device location manager 142 can keep track of the location of each of the wireless device 120, 122. Other location determination approaches can be used by the wireless devices 120, 122, to determine their geographic location in the environment 100. For example, a wireless device 120, 122, may utilize a gyro based dead reckoning approach, or an accelerometer based approach, Enhanced Observed Time Difference (EOTD), Uplink Time Difference of Arrival (UTDOA), or a combination of the approaches and devices discussed above. The location information can then be both tracked by the wireless device 120, 122, and sent from the wireless device 120, 122, to the wireless device location manager 142.

The geographic location information associated with each of the wireless devices 120, 122, can be provided by the wireless device location manager 142 to the EAS wireless device monitor 134 at the EAS information processing system 108. This location information can be used by the EAS Alert Handler 130 to create additional EAS alert messages to send to the wireless devices 120, 122, as will be discussed in more detail below.

The EAS Alert Handler 130 of the EAS information processing system 108, according to one embodiment, analyzes the emergency alert system alert message sent out to the wireless devices 120, 122, by the EAS information processing system 108, and then instructs the EAS message manager 132 to create one or more additional augmented alert messages to supplement the EAS emergency alert message. For example, the EAS information processing system 108, in one embodiment, tracks each recipient wireless device 120, 122, and based at least in part on the available location information of the wireless devices 120, 122, augments the EAS emergency alert message with auxiliary information that can be used to instruct the user of the wireless device to safety, e.g., to a safe zone 150 and/or away from a danger zone 158.

The auxiliary information for the augmented alert message, in one embodiment, is found in an auxiliary information database 138 in the EAS information processing system 108. The EAS information processing system 108 retrieves the auxiliary information from the auxiliary information database 138 and then adds the auxiliary information to the augmented alert message. The auxiliary information in the augmented alert message can be indicative of a direction to follow for a user of the wireless device 120, 122, to move to safety, e.g., toward a safe zone 150 or away from a danger zone 158, or both. The auxiliary information in the augmented alert message helps a user to identify and locate a safe zone 150, or a direction toward a safe zone 150 or to safety, by providing specific directions to the user to move to the safe zone 158. It can also direct the user away from a danger zone 158, by similarly providing specific directions to the user to move away from a danger zone 158. The augmented information can be based on logistics of the vicinity where the wireless devices 120, 122, are located. Logistics during an emergency alert situation refer to evacuation or movement of individuals to safety, to a safe zone 150, or away from a danger zone 158. The logistics of a particular vicinity (or area) indicate the optimum or recommended ways that the users of the wireless devices 120, 122, can move through the vicinity toward safety, or away from danger zone 158, or both.

The EAS information processing system 108, for example, can also augment the EAS alert message received by a wireless device 120, 122 with critical information such as the specific location of one or more nearest exits or safe zones 150, in the vicinity, and specific emergency exit/evacuation routing information for the particular users of the wireless devices 120, 122. For example, the EAS Alert Handler 130 of the EAS information processing system 108, according to one embodiment, analyzes the emergency alert system alert message sent out to the wireless devices 120, 122. From the EAS alert message the system 108 can determine a routing strategy for the wireless devices 120, 122, based on any combination of the location of each of the wireless devices 120, 122, the location of a nearest safe zone 150, the location of the danger zone 158, and logistics of the vicinity as stored, maintained, and updated in the auxiliary information database 138. The auxiliary information database 138 contains, among other information, emergency routing information and routing plans that can be used by the EAS information processing system 108 for directing a wireless device 120, 122, to an emergency exit, to a nearest safe zone 150, or away from a danger zone 158, or a combination thereof.

As an example, the EAS information processing system 108 can determine a current location of the wireless device 120, 122, and whether the wireless device is moving closer to a safe zone 150, or further away from a danger zone 158, or both, using a variety of positioning methods and devices, as have been discussed above. The wireless device monitor 134, for example, keeps track of location information associated with each of the wireless devices 120, 122; such as utilizing any combination of the known sector of coverage area where a wireless device 120, 122, should be located, or location information supplied directly from the wireless devices 120, 122, such as using GPS technology in the wireless device, or monitoring wireless communication signal strength associated with each wireless device 120, 122, or other available location determination technology.

Furthermore, to determine a best routing plan for the wireless device 120, 122, the EAS information processing system 108 can use vicinity logistic information stored, maintained, and updated current in the auxiliary information database 138. For example, current traffic conditions or congestion points may be monitored and such information can be, at least in part, the basis for selecting an alternative routing plan for the evacuation or movement of the wireless device 120, 122, through the vicinity. The EAS information processing system 108 can direct a first wireless device 120 to take one evacuation route while directing a second wireless device 122 to take a different evacuation route, even if the two wireless device 120, 122 are being directed toward the same safe zone 150, or away from the same danger zone 158, or both.

Other vicinity logistic information can include real time (or near real time) determination of hazardous conditions in potential routes for the wireless device 120, 122. Flooding hazards, fire hazards, traffic accidents and blockages, snow blizzard hazards, movement of dangerous gas clouds, forecasted path of tornadoes, are all examples of potential hazardous conditions that could impact the choice of a routing plan for a wireless device 120, 122. The EAS information processing system 108 can monitor the various possible hazardous conditions, such as discussed above, that are impacting potential routes through the vicinity by utilizing sensor data received from the various sensors 145, 146, 147, 148. These sensors 145, 146, 147, 148, supply early information regarding whether hazardous conditions are impacting a potential escape path for users of the wireless devices 120, 122. For example, during a hurricane surge event, water level sensors 145, 146, 147, 148, can be used to reroute around areas that are low lying and flood early. Therefore, many different types of sensors and detectors can be used in various embodiments of the present invention to assist the EAS information processing system 108 in directing the users of the wireless devices 120, 122, to safety.

Figure 7:
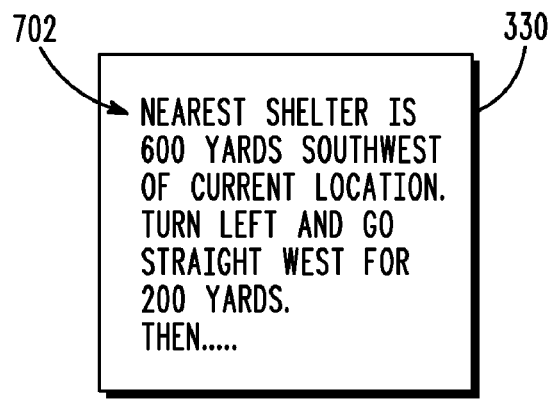
FIGS. 7 and 8 illustrate examples of augmented alert message information provided to a user of a wireless device via a user interface according to various embodiments.

Once the EAS Alert Handler 130 determines a routing plan, the EAS message manager 132 generates an augmented alert message including auxiliary information. Auxiliary information comprises any information pertaining to the activated EAS alert condition and that is additional information beyond the information provided to the wireless devices 120, 122, in the standard EAS alert message. The augmented alert message can include many different types of information to direct a user of the wireless device 120, 122, to safety. For example, as shown in FIG. 7, text message information 702 can be displayed via a user interface 330 to provide such information to the user of the wireless device 120, 122. As shown in FIG. 7, the information can include the current location information with respect to the nearest safe zone 150 or emergency exit; specific directions to how the user can traverse the vicinity to follow a route plan to safety; and can also include emergency safety tips other similar information.

Figure 8:
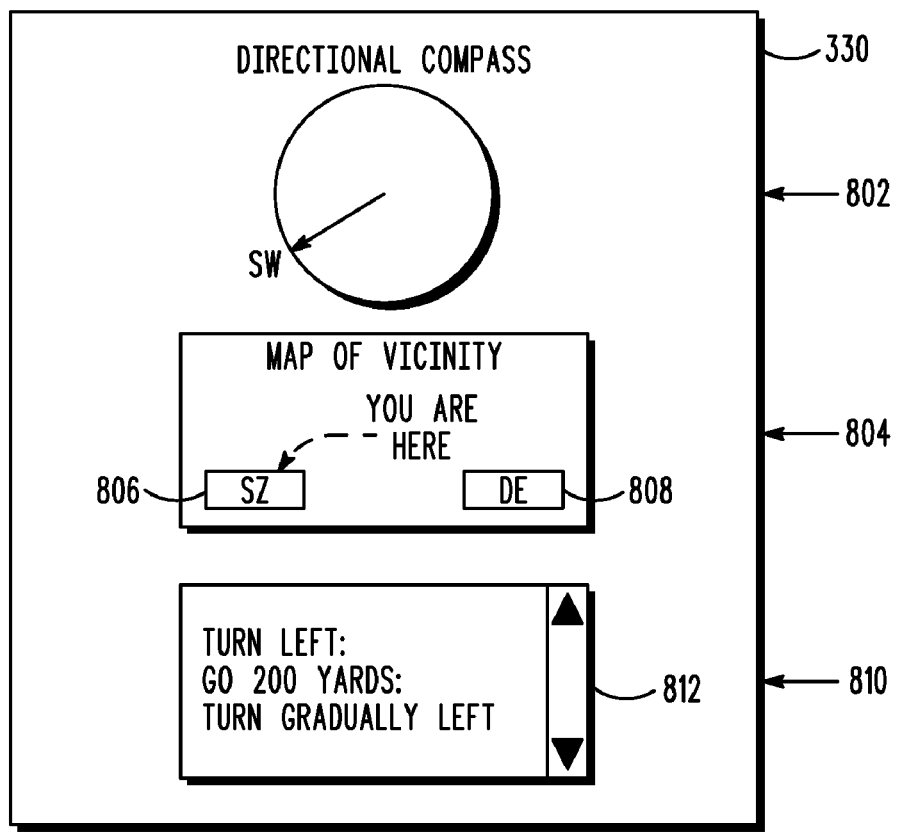

As shown in FIG. 8, the augmented alert message can include other forms of information to direct the user of the wireless device 120, 122, to safety. For example, the wireless device 120, 122, via the user interface 330, can present to the user a directional compass 802 to point out the direction to safety. Also, the user interface 330 can present a map 804 to the user and optionally indicate the location of a safe zone 806, a location of a danger zone 808, and a recommended escape route to follow to safety. Of course, as has been discussed above, a text message 810 can also be presented to the user. One or more scroll bars 812 can be used by the user to scroll through the text message in a display in the user interface 330. Moreover, as shown in FIG. 8, a combination of one or more of the various forms of presenting information to the user can be used to communicate direction to safety to the user. Lastly, a multimedia message can be provided to the user via the user interface 330. The multimedia message can include various alert types, including visual, audible, tactile, text, graphics, and other forms of conveying an alert message to the user of the wireless device 120, 122.

The augmented alert message is transmitted to the wireless devices 120, 122, via the base stations 112, 114, 116. The type of augmented alert message (including the auxiliary information to be provided to the user) can be (but is not limited to) a text message, a multimedia message, an email, an automated message, or any other similar messaging types. The messages include text, pictures, voice prompts, and other visual and audio indicators.

In one embodiment, the EAS information processing system 108 can augment an emergency alert message with a pre-programmed route to a safe zone 150, or an exit. For example, the auxiliary information in the alert message can include one or more pre-programmed routes such as a first escape plan/route for a first vicinity, a second escape plan/route for a second vicinity that a user can follow after completing the first escape plan/route, and other subsequent escape plan/routes as necessary to direct the user to safety. The EAS information processing system 108 sends the appropriate information to each wireless device 120, 122, based on location information associated with each particular wireless device 120, 122. The EAS information processing system 108 can also send general escape/exit plan/routes that include all of the routes for the entire vicinity (or sequence of vicinities). The user is then able to determine what route is appropriate for him/her. Also a user, in one embodiment, can send (e.g., wirelessly transmit via the user's wireless device 120, 122, and the wireless communication system and network 102) the user's current position information to the EAS information processing system 108. In response, the user would receive a plan/route to safety from the EAS information processing system 108 based on the transmitted current position information.

According to one embodiment, the type of danger zone 158 and associated hazardous event can indicate that a dispersal of all individuals from the danger zone 158 is the recommended movement and accordingly such directions are provided to users of the wireless devices 120, 122. If an emergency alert system alert condition is a dispersal event, such as a leak of a dangerous gas, users can be instructed to disperse from the location coordinates of the dispersal event (the danger zone 158) in a general direction away from the location coordinates of the dispersal event. All users in the vicinity would be directed to escape danger 158 by moving radially outward from the location coordinates of the dispersal event 158 in an outwardly moving ring pattern.

The location coordinates for use by all users carrying the wireless devices 120, 122, can be provided in a universal coordinate system, such as longitude and latitude values. The location of each safe zone, danger zone, base stations, wireless devices, sensors, and other logistics and geographical features of interest can be provided in this universal coordinate system. This allows uniform location information to be used with all users of wireless devices 120, 122, in guiding their movement to safety. Alternatively, for the safe zones and base stations, their position could also be represented in civic address formats, and geo-coding to/from civic address can be used to translate between the two formats.

In one embodiment, a safe zone 150 can be equipped with a transceiver 152 that is operable by a local EAS message controller 154 to send messages to the EAS information processing system 108. The EAS message controller 154 can remain idle monitoring for EAS alert messages that are relevant to the particular safe zone 150. For example, the safe zone 150 may be equipped with a battery power supply system (not shown) that can supply electrical power on demand for powering the idling EAS message controller 154 and other electrical components at the safe zone 150. After receiving a relevant EAS alert message, the idling EAS message controller 154 can activate all of its functions (and return to full non-idling operation) and send a notification and information message to the EAS information processing system 108, based on the local coordinates 156 of the safe zone 150, as stored in local memory communicatively coupled with the EAS message controller 154.

The local EAS message controller 154, in one embodiment, transmits the notification and information message to the EAS information processing system 108 using the transceiver 152 in wireless communication with the transceiver 136 at the EAS information processing system 108. In another embodiment, the EAS message controller 154, using the transceiver 152, can register with the nearest base station 112 in the wireless communication system and network 102, and then establishes a communication path to the wireless communication system controller 110. The wireless communication system controller 110 relays, and delivers to the EAS information processing system 108, the notification and information message received from the EAS message controller 154 at the safe zone 150. These two examples discussed above are non-limiting, and it is anticipated that there are many other ways of delivering the notification and information message from the EAS message controller 154 to the EAS information processing system 108. For example, other communication networks and links, (such as, but not limited to, PSTN, a wide area network, the Internet, a broadcast radio channel, satellite communication), can be used to get the notification and information message from the safe zone 150 to the EAS information processing system 108.

Once the EAS information processing system 108 determines that there is an active and available safe zone 150 for a particular EAS alert condition that has been activated, the EAS information processing system 108 can update the auxiliary information database 138 with the received information associated with the safe zone 150. This information can now be used to direct users of wireless devices 120, 122, to the safe zone 150. The notification and information message sent to the EAS information processing system 108 acts as a beacon signal and message to alert users of wireless devices 120, 122, that the safe zone 150 is available for their safety. The wireless devices 120, 122, with the given location coordinates of the safe zone 150, can use this information to locate the safe zone 150, similar to a homing beacon signal that guides the users of the wireless devices 120, 122, to the safe zone 150.

Once the wireless device 120, 122, receives the augmented alert message from the EAS information processing system 108, and based on the auxiliary information extracted at the wireless device 120, 122, from the received augmented alert message, the EAS controller 126 within the wireless device 120, 122, provides emergency alert information to the user via the user interface 128 used to provide emergency alert information to the user. For example, the EAS controller 126 displays at the user interface 128 the auxiliary information within the augmented emergency alert message. The user is then able to follow the routing directions to safety.

According to one embodiment, the location/direction manager 127 (see FIG. 3), at the wireless device 120, 122, monitors the current location of the wireless device 120, 122, and provides current location information to the EAS controller 126. The EAS controller 126 uses this information, in combination with the auxiliary information from the augmented alert message, to present to the user the directions to safety.

Additionally, the directions and information presented to the user can change as the user moves. So, the EAS controller 126 uses the current location information to advance/change the directions and routing information provided to the user leading the user to safety. For example, a first routing prompt could tell the user to keep moving straight or in the current direction. As the user moves, a second prompt could tell the user to turn right, etc.

As can be seen, the various embodiments of the present invention are advantageous because an emergency alert message can be augmented with critical escape/exit route information and provided to a user of a wireless device 120, 122, via a user interface 128, such as displayed to the user via a display on the wireless device 120, 122. Also, visual and audio indicators can be sent or activated on a wireless device to help a user find an exit or safe pathway.

Wireless Device

Figure 3:
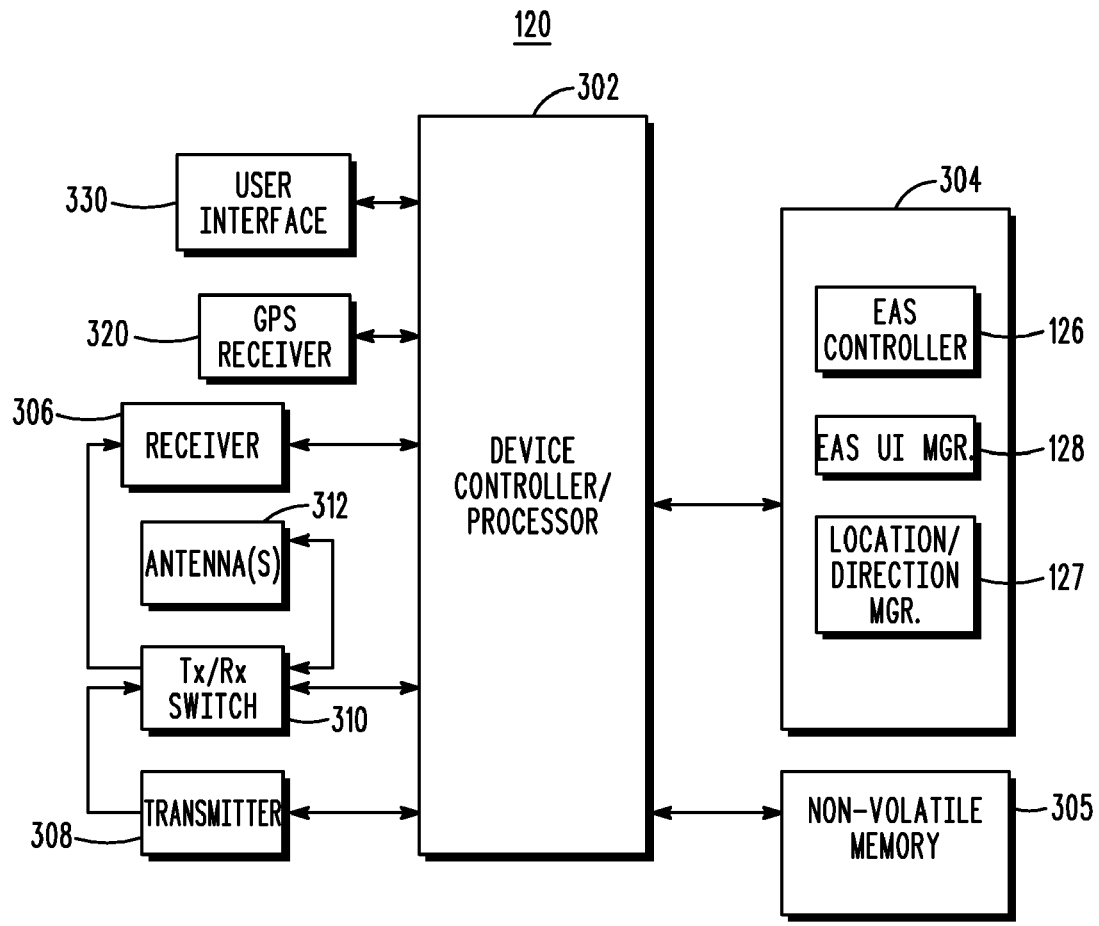
FIG. 3 is a block diagram illustrating a detailed view of a wireless device as implemented in the example of FIG. 1, according to one embodiment of the present invention.

FIG. 3 is a block diagram illustrating a more detailed view of the wireless device 120, 122, according to one embodiment of the present invention. It is assumed that the reader is familiar with wireless communication devices. To simplify the present description, only that portion of a wireless communication device that is relevant to the present invention is discussed. The wireless device 120, 122, operates under the control of a device controller/processor 302, that controls the sending and receiving of wireless communication signals. In receive mode, the device controller 302 electrically couples at least one antenna 312 through a transmit/receive switch 310 to a receiver 306. The receiver 306 decodes the received signals and provides those decoded signals to the device controller 302.

In transmit mode, the device controller 302 electrically couples the at least one antenna 312, through the transmit/receive switch 310, to a transmitter 308. The wireless device 120, 122, can also include an additional transceiver as discussed above. For example, a multi-mode wireless device 120, 122, can communicate over multiple channels and accordingly would utilize multiple transceivers. However, the receiver 306 and transmitter 308 pair can also provide the functionality of the transceiver discussed above. The wireless device 302 also includes volatile memory 304 and non-volatile storage memory 305. Either of these memories 304, 305, can include the software components implementing the EAS controller 126, the EAS user interface manager 128, and the Location/Direction Manager 127. These three components 126, 128, 127, have been discussed above in greater detail. For example, the EAS user interface manager can operate to control how information is presented to a user of the wireless device 120, 122, via the user interface 330. The user interface 330, comprises one or more different user interface technologies for providing alerts and messages to the user of the wireless device 120, 122, as has been discussed above. Lastly, as shown in FIG. 3, a GPS receiver module 320 is used by the controller 302 and the location/direction manager 127 to determine a current location of the wireless device 120, 122, in the universal coordinate system. As has been discussed above, other location determination technologies (e.g., gyro based dead reckoning, accelerometer based determination, etc.) can be used in combination with, or as a substitute for, the GPS receiver 320.

Information Processing System

Figure 4:
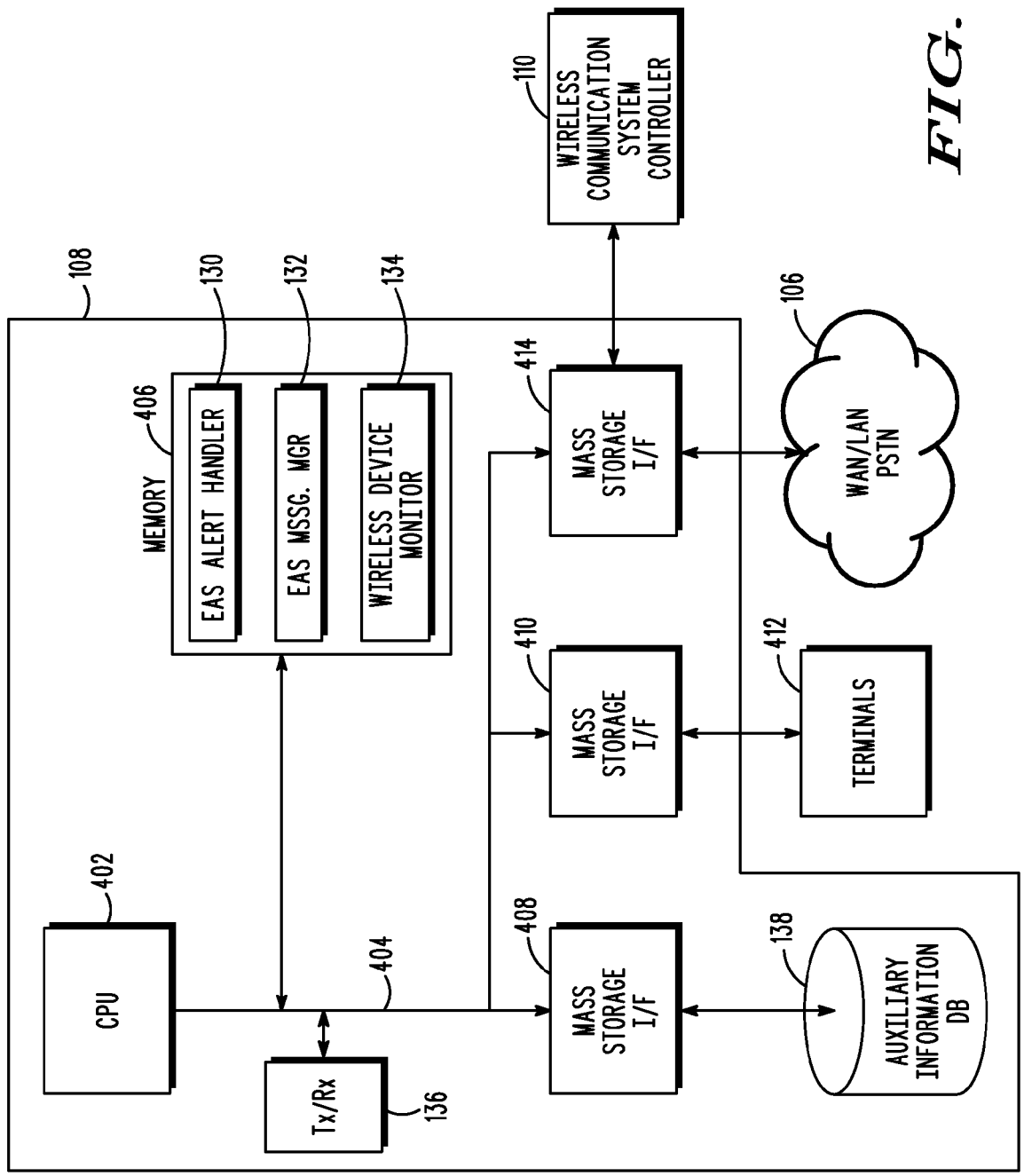
FIG. 4 is a block diagram illustrating a detailed view of an EAS information processing system as implemented in the example of FIG. 1, according to one embodiment of the present invention.

FIG. 4 is a block diagram illustrating a detailed view of an example of the EAS information processing system 108 already discussed above. The EAS information processing system 108 includes a computer. As an alternative, the EAS 108 could be a software function running on a non-dedicated application CPU that already exists in the network. The computer has one or more processors 402 that are connected to a main memory 406, a transceiver 136, a mass storage interface 408, man/machine interface hardware 410, and network adapter hardware 414. A system bus 404 interconnects these system components. The mass storage interface 408 is used to connect mass storage devices, such as the auxiliary information database 138 to the information processing system 108. The man/machine interface hardware 410 can be communicatively coupled with terminals 412 for users of the information processing system 108 to administrate and manage the system 108. The network adapter hardware 414, in this example, is communicatively coupled with the wireless communication system controller 110 and with the network cloud 106 as has been discussed above, but likely via different interfaces.

The main memory 406, in one embodiment, includes an EAS alert handler 130, an EAS message manager 132, and a wireless device monitor 134, which have been discussed above in greater detail. Various embodiments of the present invention can be adapted to work with any data communications connections including present day analog and/or digital techniques or via a future networking mechanism.

Process For Augmenting Emergency Alert Messages

Figure 5:
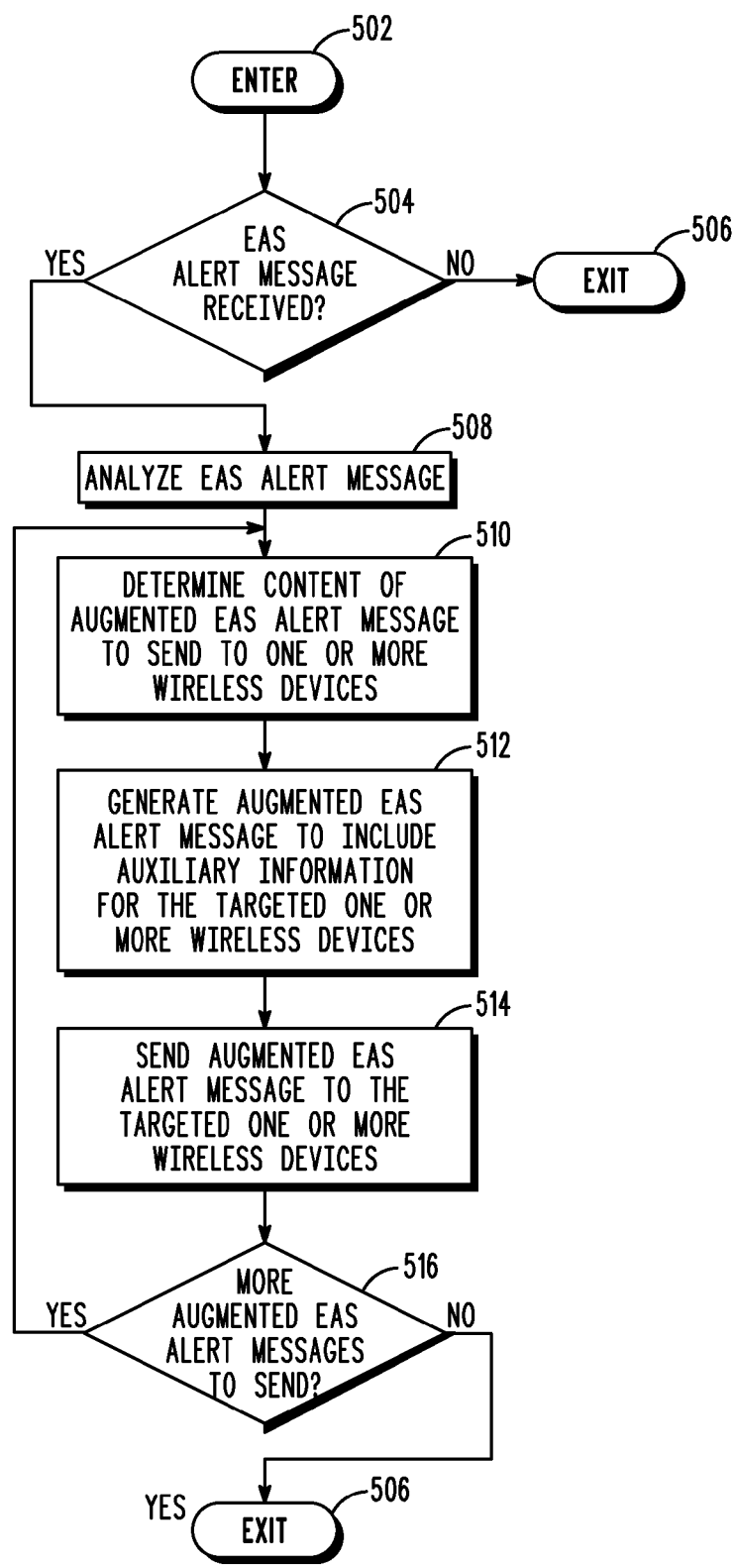
FIG. 5 is an operational flow diagram illustrating a process of augmenting emergency alert system alert messages with auxiliary information to send the augmented alert messages to one or more wireless devices in the wireless communication system shown in FIG. 1, according to one embodiment of the present invention.

FIG. 5 is an operational flow diagram illustrating a process of creating and sending augmented emergency alert messages to wireless devices 120, 122. The operational flow diagram of FIG. 5 begins at step 502, and then flows directly to step 504. The EAS information processing system 108, at step 404, determines whether an EAS emergency alert message has been sent to the wireless devices 120, 122. If not sent, then the process exits, at step 506. The EAS information processing system 108, at step 508, analyzes the EAS emergency alert message.

The EAS information processing system 108, at step 510, determines the content of the augmented EAS alert message, including the auxiliary information, to send to the wireless devices 120, 122, based on the analyzed EAS emergency alert message, the current location of the wireless devices 120, 122, the available auxiliary information from the database 138, and other relevant information available to the system 108. For example, an escape/routing strategy for the wireless devices 120, 122, at step 510, is determined. The EAS information processing system 108, in one embodiment, analyzes routing information from the auxiliary information database 138 to determine the best plan/route or a pre-programmed plan/route to send to the wireless devices 120, 122, to get the user to safety.

The EAS information processing system 108, at step 512, generates the augmented EAS alert message, including the determined content and auxiliary information. The auxiliary information is targeted for the wireless devices 120, 122, to instruct the users of the wireless devices to move to safety. As discussed above, the routing information in the auxiliary information can be a dynamically generated plan/route that has been generated based on the current position of the wireless devices 120, 122. The routing information can also be a pre-programmed plan/route. It can also include an emergency beacon message associated with (and generated from) communication with the EAS message controller 154 at the safe zone 150. This beacon message guides the users of the wireless devices 120, 122, to the safe zone 150.

The EAS information processing system 108, at step 514, sends the augmented EAS alert message to the wireless devices 120, 122. If there is more augmented EAS alert message to send to wireless devices 120, 122, at step 516, the process repeats the steps 510, 512, 514, and 516. If no more to do, at step 516, the control flow then exits at step 506.

Figure 6:
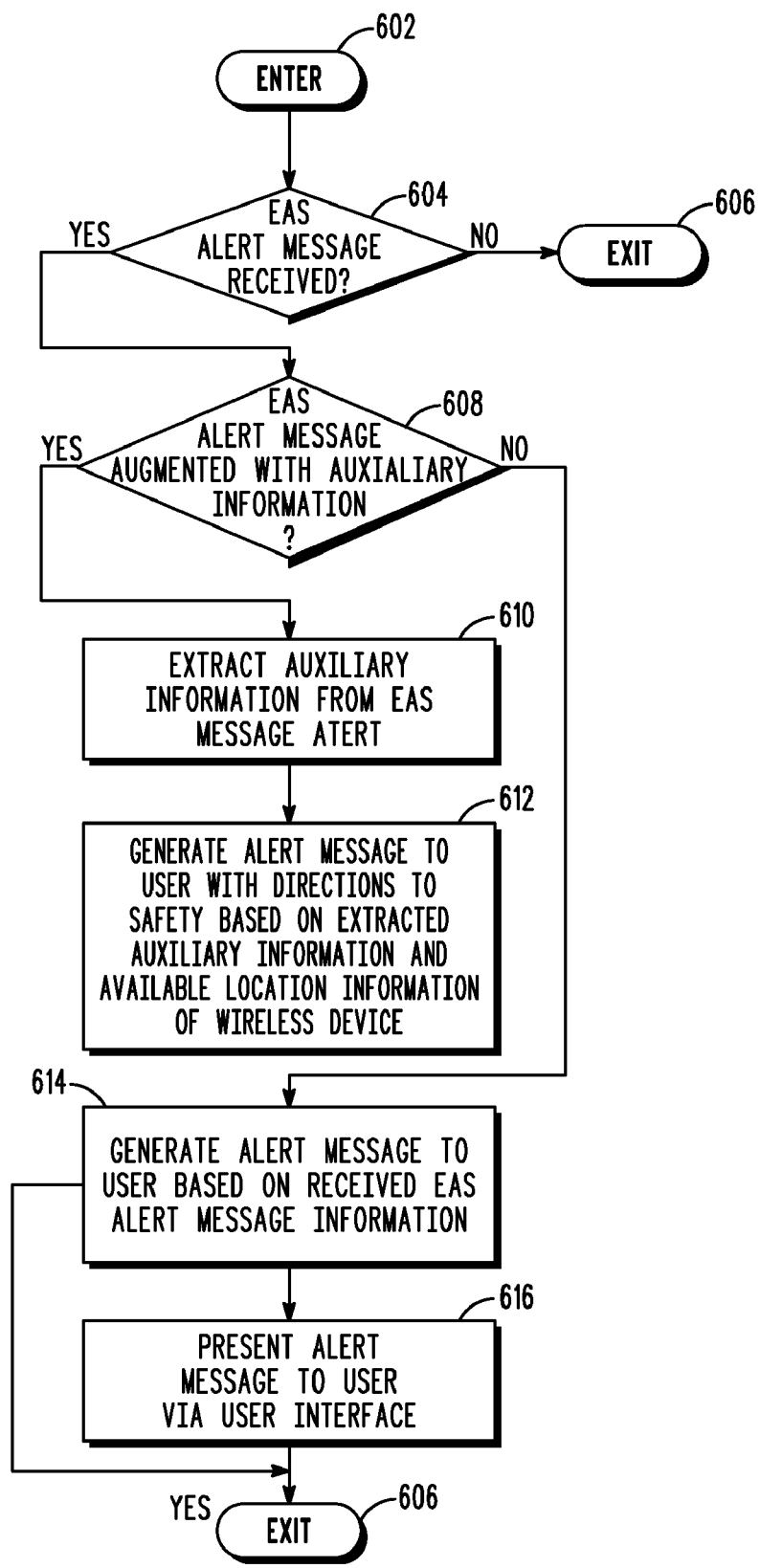
FIG. 6 is an operational flow diagram illustrating a process of receiving and handling augmented emergency alert system messages at a wireless device shown in FIG. 1 to direct a user of the wireless device to safety, according to one embodiment of the present invention.

FIG. 6 is an operational flow diagram illustrating an example of a process at the wireless device 120, 122, for communicating with the user the information from received emergency alert messages. The operational flow diagram of FIG. 6 begins at step 602, and then flows directly to step 604. While no EAS alert message is received, at step 604, the process exits at step 606. However, when an EAS alert message is received, the wireless device 120, 122, then checks the EAS alert message for augmented message information. If no augmented message information is found in the received EAS alert message, then, at step 614, the wireless device 120, 122, generates an alert message based on the received EAS alert message, and then, at step 616, provides the generated alert message to the user of the wireless device 120, 122, via the user interface 330.

If the received EAS alert message comprises an augmented alert message, including auxiliary information, at step 608, the wireless device 120, 122, extracts the auxiliary information from the message, at step 610. The wireless device 120, 122, then, at step 612, generates an alert message with directions to the user to get to safety. The alert message is generated based on the extracted auxiliary information and available location information of the wireless device 120, 122. As has been discussed above, the location/direction manager 127 maintains current location information for the device 120, 122. The wireless device, at step 616, presents the alert message, including information based on the auxiliary information, to the user via the user interface. The presented alert message, as has been discussed above, provides directions to the user to get to safety. The control flow then exits at step 606.

It should be noted that while the wireless device 120, 122, is in an emergency alert mode, the EAS controller 126 can provide one or more additional messages to the user of the device 120, 122, to guide the user to safety. Each of these additional messages may be based on the change in location of the wireless device 120, 122, as monitored by the location/direction manager 127, and also based on the most current received auxiliary information from a received augmented alert message. In this way, the wireless device 120, 122, operates relatively autonomously without requiring further instructions from the EAS information processing system 108 during this process of guiding the user to safety.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method with a wireless communication system for transmitting emergency alert system messages to wireless devices, the method comprising:

receiving an emergency alert system (EAS) alert message for delivery to one or more wireless devices in a coverage area of a wireless communication system;

generating, in response to receiving the EAS alert message, an augmented EAS alert message that includes auxiliary information that provides information to the one or more wireless devices to direct one or more users of the one or more wireless devices, respectively, to move at least one of toward a safe zone and away from a danger zone; and wirelessly transmitting the augmented EAS alert message in the coverage area, the augmented EAS alert message being destined for reception by the one or more wireless devices;

wherein the auxiliary information provides information to the one or more wireless devices to direct the one or more users of the respective one or more wireless devices to move toward a safe zone at a pre-defined location.

2. The method of claim 1 further comprising:
wirelessly transmitting the received EAS alert message to the one or more wireless devices in the coverage area.

3. The method of claim 1 wherein the augmented EAS alert message includes auxiliary information that provides additional information, beyond information provided by the EAS alert message, to direct the one or more users of the respective one or more wireless devices to safety.

4. The method of claim 1 wherein the safe zone comprises at least one of: a shelter, a hospital, a government building, a vehicle, and a designated safe area associated with at least one of a vicinity and structure.

5. The method of claim 1 wherein the auxiliary information provides information that is based on logistics of a vicinity affected by the danger zone.

6. The method of claim 1 wherein the auxiliary information comprises an emergency beacon message from the safe zone, the emergency beacon message including location information identifying the location of the safe zone.

7. The method of claim 1 further comprising:
retrieving the auxiliary information from an auxiliary information database.

8. The method of claim 7 further comprising:
updating the auxiliary information in the auxiliary information database.

9. The method of claim 8 wherein the updating comprises updating the auxiliary information in the auxiliary information database with at least one of: location of each of the one or more wireless devices in a coverage area, location of the safe zone, location of the danger zone, and logistics of a vicinity affected by the danger zone.

10. The method of claim 1 wherein the auxiliary information provides information to the one or more wireless devices to direct the one or more users of the respective one or more wireless devices to move away from a danger zone, and wherein the auxiliary information provides information that is based on logistics of a vicinity affected by the danger zone.

11. A method with a wireless device for directing a user of the wireless device to safety, the method comprising:
    receiving an EAS alert message transmitted in a coverage area of a wireless communication system;
    receiving an augmented EAS alert message transmitted in a coverage area of a wireless communication system, wherein the augmented EAS alert message comprises auxiliary information that provides information to the wireless device to direct a user of the wireless device to move at least one of toward a safe zone and away from a danger zone; and
    directing a user of the wireless device, based on the auxiliary information in the received augmented EAS alert message, to move at least one of toward a safe zone and away from a danger zone;
    wherein the directing comprises:
        presenting an alert message via a user interface at the wireless device, the alert message being based on the auxiliary information in the received augmented EAS alert message, the alert message directing the user of the wireless device to safety based on at least one of: location of the wireless device in a coverage area, location of the safe zone, location of the danger zone, and logistics of a vicinity affected by the danger zone.

12. A wireless device capable of directing a user of the wireless device to move to safety, the wireless device comprising:
    memory;
    a processor, communicatively coupled to the memory;
    a user interface, communicatively coupled to the memory and the processor; and
    an emergency alert system controller, communicatively coupled to the memory, the processor, and the user interface, and adapted to:
        receive an EAS alert message transmitted in a coverage area of a wireless communication system;
        receive an augmented EAS alert message transmitted in a coverage area of a wireless communication system, wherein the augmented EAS alert message comprises auxiliary information that provides information to the wireless device to direct a user of the wireless device to move at least one of toward a safe zone and away from a danger zone; and
        direct a user of the wireless device, based on the auxiliary information in the received augmented EAS alert message, to move at least one of toward a safe zone and away from a danger zone;
    wherein the emergency alert system controller is further adapted to present an alert message via the user interface, the alert message being based on the auxiliary information in the received augmented EAS alert message, the alert message directing the user of the wireless device to safety based on at least one of: location of the wireless device in a coverage area, location of the safe zone, location of the danger zone, and logistics of a vicinity affected by the danger zone.

13. The wireless device of claim 12 wherein the emergency alert system controller is further adapted to present the alert message via the user interface by at least one of: presenting textual information at the user interface, presenting graphical information at the user interface, presenting a directional compass at the user interface, presenting a map at the user interface, presenting an audible alert at the user interface, and presenting a tactile alert at the user interface.

14. The wireless device of claim 12 further comprising a location/direction manager for tracking a current location of the wireless device, and the emergency alert system controller being communicatively coupled with the location/direction manager, and the emergency alert system controller being further adapted to:
    analyze the auxiliary information in the received augmented EAS alert message; and
    direct a user of the wireless device, based on the auxiliary information in the received augmented EAS alert message and the tracked current location of the wireless device, to move at least one of toward a safe zone and away from a danger zone.

* * * * *